United States Patent [19]

Orain

[11] 4,062,603
[45] Dec. 13, 1977

[54] AXIAL STOP RING AND ITS APPLICATION AND A METHOD AND DEVICE FOR ITS MANUFACTURE

[75] Inventor: Michel Alexandre Orain, Conflans Ste Honorine, France

[73] Assignee: Glaenzer Spicer, Poissy, France

[21] Appl. No.: 696,316

[22] Filed: June 15, 1976

[30] Foreign Application Priority Data

July 10, 1975 France ................................ 75.21680

[51] Int. Cl.² .................................................. F16C 33/64
[52] U.S. Cl. .............................. 308/217; 308/DIG. 11
[58] Field of Search ................ 308/217, 235, DIG. 11; 277/206, 205

[56] References Cited

U.S. PATENT DOCUMENTS

| | | | |
|---|---|---|---|
| 3,881,792 | 5/1975 | Orain | 308/DIG. 11 X |
| 3,937,541 | 2/1976 | Alling | 308/235 |

*Primary Examiner*—Joseph F. Peters, Jr.
*Assistant Examiner*—Gene A. Church
*Attorney, Agent, or Firm*—Wenderoth, Lind & Ponack

[57] ABSTRACT

The stop member has a shape of revolution and an L-shaped cross section. The re-entrant angle defined by the two branches of the L faces the axis of the member. A skirt portion of the member which corresponds to the branch of the L which is parallel to the axis of the member has corrugations. A flange of the member which is perpendicular to the axis of the member corresponds to the other branch of the L.

The stop member can be combined with an annular groove of a shaft to axially retain the shaft. The diameter of the opening defined by the flange of the member is slightly larger than the diameter of the shaft and the minimum diameter defined by the corrugated skirt portion is less than the diameter of the shaft.

A method and device for producing the stop member are also described.

5 Claims, 7 Drawing Figures

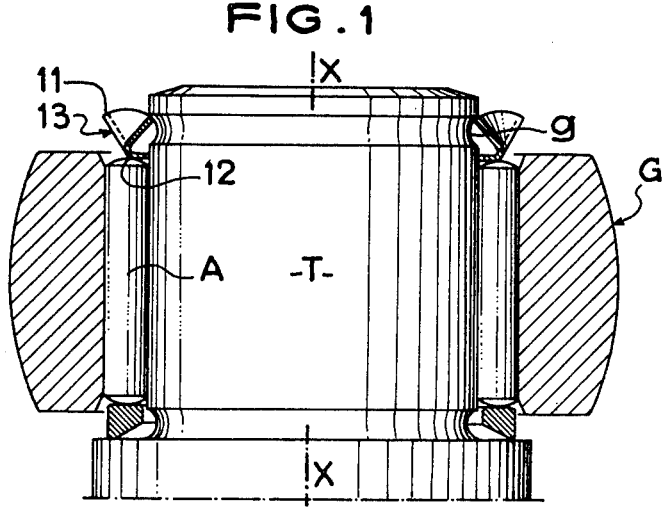
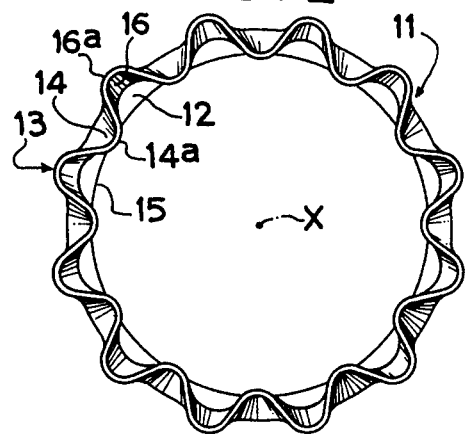
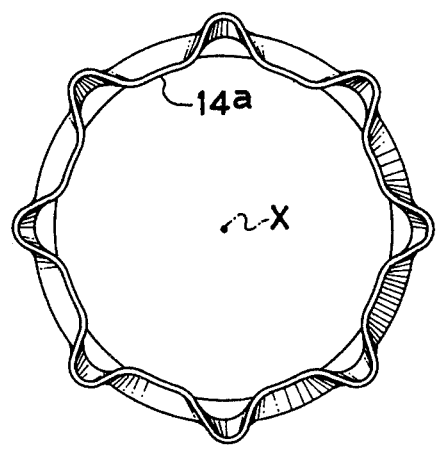

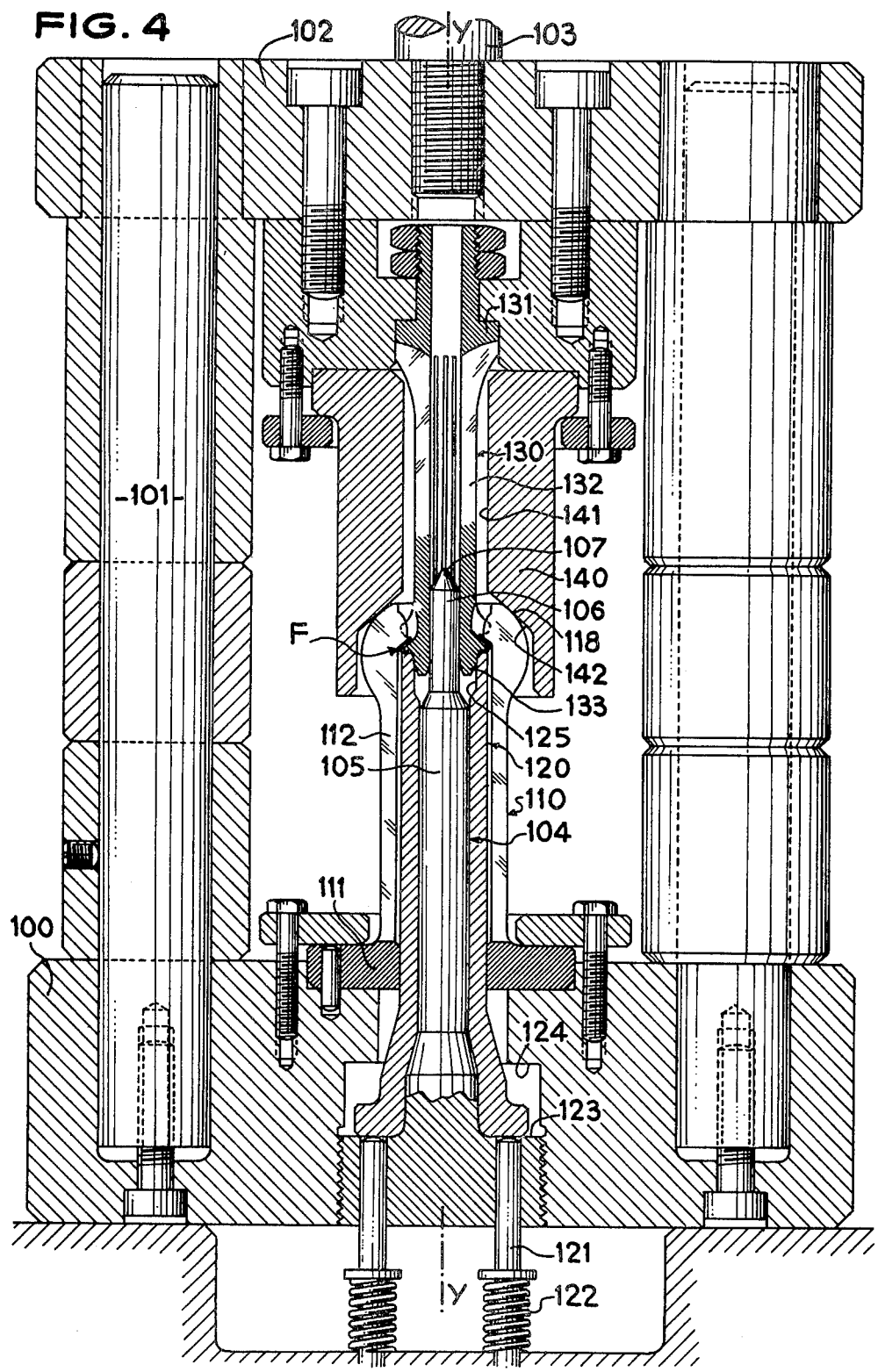

AXIAL STOP RING AND ITS APPLICATION AND A METHOD AND DEVICE FOR ITS MANUFACTURE

The present invention relates to parts employed for providing an axial stop for at least one element an example of which will be given hereinafter with respect to a shaft or the like on which this element is rotatably and/or slidably mounted.

Such a part is in particular employed for axially retaining needles and a roller of a tripod joint with respect to a trunnion on which they are mounted, when the joint is being assembled, so as to ensure that, under the effect of gravity or shocks the rollers, in sliding on the needles, do not drop off and release the needles and allow them to fall. These parts also have for function to ensure that the needles are retained when the joint is assembled and the rollers are received in the grooves of the corresponding bell member. Generally speaking, other applications can also be found, the chosen embodiment being given merely by way of example.

There has been described in French Pat. No. 73 15 501 a stop member which is engaged by an elastically yieldable clipping in a groove machined in the surface of a shaft. There is no need here to go into the details of the prior art with respect to which this stop member is distinguished and the drawbacks that it attempted to remedy. This stop member disclosed in the prior patent has a shape roughly of revolution with a U-shaped section, whose inner skirt, that is to say the skirt placed near to the shaft, is corrugated, the crests of these corrugations the nearest to the shaft being tangent to a circle having a diameter less than the diameter of the shaft on which it is mounted so as to ensure the axial retention of the ring in the groove formed on the periphery of the shaft. This ring is a substantial improvement over the prior art but has a number of drawbacks. In particular, production difficulties arise, which result from the particular shape of this ring. More precisely, the material necessary for forming the corrugations must be taken from a blank of smaller diameter. The folding of the metal therefore requires a considerable elongation of the material since the initial inside diameter of the blank must be increased by more than 100° in order to provide the complete outer contour or perimeter of the corrugations. An elongation of this order can result in the rupture of the blank by circular extension and renders the edge of the inner corrugations which support the stresses fragile. Thus the device is also less reliable. Moreover, the folding of the corrugations from the interior of the ring toward the median zone of the U poses complex production problems as concerns the disengagement of the tool from between the corrugated zone and the outer skirt portion which may be smooth.

An object of the invention is to avoid these two main drawbacks, namely a high rate of elongation of the material and difficulty of production, with a novel design of the member and a method and tool for its production.

According to the invention, there is provided a stop member which is roughly of revolution and adapted to axially retain an element mounted concentrically with a shaft, the shaft having a radial retaining surface against which the stop member abuts, wherein the stop member has a roughly L-shaped cross-section, the re-entrant angle defined by the two branches of the L faces the axis of the member, the stop member has a corrugated skirt portion which corresponds to the branch of the L which is roughly parallel to the axis, the crests of the corrugations the nearest to the axis being at a distance from the axis less than the radius of the retaining surfaces formed on the shaft.

This ring preferably has a planar, or substantially planar, annular flange contained in a plane roughly perpendicular to the axis and the corrugated skirt portion extends from the outer edge of said flange.

According to one embodiment, the skirt portion has corrugations which are outwardly inclined in certain zones, the amplitude of these corrugations being such that their outer crests the most remote from the axis are at a distance from the latter at least slightly greater than the inside diameter of an element to be retained, such as, for example, a roller of a tripod joint.

Another object of the invention is to provide an axial stop device for at least one element on a shaft, said shaft having a retaining groove in which there is elastically engaged a stop member such as that defined hereinbefore, the diameter of the opening defined by the flange perpendicular to the axis of the stop member being slightly greater than the diameter of the shaft and the diameter of said opening in the region of the inner crests of the corrugations is less than the diameter of the shaft so as to ensure the retention and a jamming in the groove.

According to a preferred method for manufacturing such a stop member, a blank is taken, constituted by a flat metal annular member, and the blank is blocked along its inner periphery by a first element and a second element, the free part of the blank is folded and progressively formed over and around the second element, which is suitably shaped, by a third element so as to impart the desired shape to the skirt portion of the stop member, and then the second and the third elements are radially and axially disengaged and the formed member is extracted.

A device for carrying out said method comprises a sleeve constituting tthe first element and defining a radial support surface for the blank and an inner guide surface, an expansible punch constituting the second element and defining a radial support surface facing the surface defined by the sleeve and forming surfaces corresponding to the inner side of the corrugations of the stop member, a central rod adapted to expand the punch, an outer deformable mamdrel constituting the third element and defining forming surfaces which are complementary to the forming surfaces carried by the punch and correspond to the outer face of the corrugations of the ring, means for achieving a relative axial and radial displacement between the punch, on one hand, and the sleeve and rod, on the other hand, and between the outer mandrel and the punch.

According to one embodiment, the centre rod and the outer mandrel are fixed, the sleeve is mounted to be slidable a given extent with respect to the rod and the mandrel, it being urged elastically toward the punch, the latter being integral with an element defining at least one ramp cooperative with the outer mandrel and being slidably mounted coaxially and in front of the assembly comprising the rod, mandrel and sleeve under the control of a suitable actuating device.

Preferably and in accordance with an important feature of this tool, the punch and/or the mandrel has a body from which a plurality of branches extend, the branches being connected to the body in such manner as to be each capable of moving angularly in a plane containing the axis of the punch or the mandrel, said branches defining at their free end the forming surfaces adapted to cooperate with the metal blank from which the stop ring is made.

The aforementioned member defining at least one ramp has preferably a bell shape and cooperates with the profiled outer surface of the branches of the mandrel, the shapes of the inner surface of the bell and the outer surface of the mandrel being chosen in such manner as to produce the desired radial displacement of the branches of the mandrel when there is a relative axial displacement between the mandrel and the bell.

The invention will now be described in more detail with reference to the accompanying drawings which are given solely by way of example and in which FIG. 1 is an axial sectional view of a stop member according to the invention in a particular application;

FIG. 2 is a plan view of this stop member;

FIG. 3 is a view corresponding to FIG. 2 of a modification;

FIG. 4 is a sectional view of a device employed for producing such a stop member.

Figure 5:
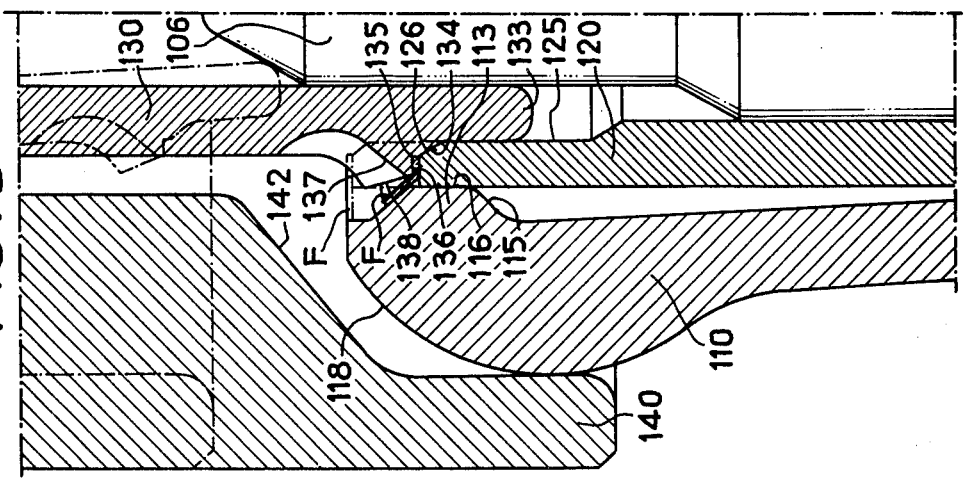
FIGS. 5, 6 and 7 are views illustrating the method of producing the stop member according to the invention with the tool shown in FIG. 4.

Reference will first be made to FIGS. 1 and 2 to describe such a stop member in an application in which it axially retains needles A and a roller G on a trunnion T of a tripod joint.

The trunnion T has a groove $g$ in which there is elastically engaged a stop ring 11 made from a flat blank of a hard elastically yieldable metal such as hardened steel or carbonitrated steel or an alloy containing copper or alloy containing barylium copper or other alloy.

The stop ring has the general shape of revolution about the axis X—X of the trunnion and its cross section has a substantially L shape, the re-entrant angle formed by the two branches facing the axis X—X of the ring. One of the branches of the L corresponds to a flange 12 contained in a plane perpendicular to the axis X—X. The other branch of the L, extending roughly parallel to said axis, corresponds to a skirt portion 13 which is corrugated in such manner as to define portions 14 which are inclined toward the axis of the ring and shaft. The crests 14a of these inner corrugations which are the nearest to the axis X—X are located at a distance from the axis X—X which is less than the radius of the shaft which here defines the radius of the surface retaining the stop ring with respect to the shaft. The opening 15 defined by the flange 12 of the ring has a diameter slightly greater than the diameter of the shaft so as to enable the ring to be engaged on the shaft.

In the presently-described embodiment, the corrugations of the skirt portion are such that zones 16 of the latter are directed outwardly so that the crests 16a of these outer corrugations which are therefore the most remote from the axis, are located at a distance from the latter which is slightly greater than the diameter of the inner bore of the roller G. FIG. 2 clearly shows the shape of the corrugations and the relative position of the different crests and the flange 12 perpendicular to the axis.

The stop ring is placed in position very simply, since it is sufficient to engage it on the shaft, the radial elasticity of the corrugations being sufficient to permit a deformation and the mounting of the ring on the trunnion. These corrugations deform and slightly spread apart upon the passage of the end of the shaft and resume their shape when they reach the region of the groove $g$. Likewise, the outer parts of the corrugations allow the passage of the roller G while after assembly they prevent this roller from escaping under a small force. A limited force permits the disassembly of the roller or the making of an exceptionnaly large angle, without alterating the qualities of the ring. The flange 12 receives the axial force of the needles A and this force is transmitted under excellent conditions to the operative surface of the groove $g$.

It will be understood that the choice of the number and amplitude of these corrugations is a function of the elasticity required for clipping in the groove and mounting the roller. Thus, in FIG. 3, a modification is shown in which the number of corrugations is less than in the embodiment shown in FIG. 1, this second embodiment providing a longer contact between the inner edge 14a of the corrugations and the flank of the groove $g$ which ensures an improved distribution of the supporting force between these two elements.

By way of another modification, the skirt portion could also be constructed where the domes of the corrugations are replaced by roughly cylindrical zones parallel to the axis X—X and centered on the axis of the ring. Such an embodiment is suitable if it is unnecessary to ensure the retention of parts such as the roller G of FIG. 1.

A device and a method for conveniently producing such a stop ring will now be described.

The device shown in FIG. 4 has on the whole the structure of a press comprising a frame or fixed bolster 100 from which extend vertical pillars or posts 101. A movable plate 102 is guided on these pillars and connected to the moving rod 103 of an actuating jack (not shown) which may be, for example, a pneumatic or hydraulic jack.

Fixed to the bolster of the press is a centre rod 104 having an axis Y—Y which has mainly a cylindrical body portion 105 extended in its upper part by a head 106 of smaller diameter which terminates in a conical point 107 whose apex is rounded. Also fixed to this bolster, concentrically with the rod 104, is a mandrel 110 having a body 111 by which it is fixed to the bolster and a plurality of branches 112 extending from this body, these branches being connected to the body elastically. In the presently-described embodiment, these branches are in one piece with the body and the elastic connection is obtained by a suitable choice of the dimensions of the branches. Each branch has a mean radial plane which contains the axis Y—Y of the tool and mandrel and each branch is capable of undergoing an annular movement in its plane in moving toward or away from the axis. At its free end, each of these branches has an inner surface, or forming surface, adapted to cooperate with the blank. This inner surface consists mainly of a V-sectioned projection 113 defining a front face 114 and a rear face 115 interconnected by a flat or round portion 116. Each branch also has a cylindrical part 117 for guiding the blank and a curved outer surface 118 whose function will appear more clearly hereinafter.

The lower part of this tool is completed by a generally cylindrical sleeve 120 which is guided between the centre rod 104 and the mandrel 110 and bears in its lower part on rods 121 which are biased by coil springs 122. This sleeve is therefore elastically urged upwardly and is movable to an extent defined by its abutment against two radial shoulders 123 and 124. In its upper part, the sleeve 120 has a bore 125 of slightly larger diameter and terminates in an outwardly divergent portion 126 of frustoconical shape whose largest diameter is less than the outside diameter of the mandrel. In this way, the latter defines at its free end an annular radial bearing surface 127.

The upper part of the tool comprises, integral with the moving plate 102, an expansible punch 130 whose structure is on the whole comparable to that of the fixed mandrel 110. Thus, this punch comprises a body 131 from which extend a plurality of branches 132 which are elastically deformable with respect to the body and capable of undergoing an angular displacement in their median plane containing the axis Y—Y of the tool. The punch is expansible, that is to say, before heat treatment, its branches are tightened together until they come in contact with the other so as to be capable of deforming elastically outwardly while tending to return to their tightened position.

Each of these branches terminate in a rounded end portion 133 which is guided between the head 106 of the fixed central rod and in the bore 125 of the sleeve 120. Following on this end portion, is a frustoconical portion 134 and a cylindrical shoulder 135, whose length is roughly equal to the thickness of the blank from which the stop ring is produced, and a radial bearing surface 136 corresponding respectively to the frustoconical surface 126 and the radial bearing surface 127 of the sleeve. Each branch of the punch also has an operative forming surface which is chosen in accordance with the shape it is desired to give to the ring and which defines, in the illustrated embodiment, a part 137 corresponding to the inner corrugations of the ring to be produced and a part 138 corresponding to the outer corrugations of the ring. It will be understood that the mandrel 110 and the punch 130 have complementary shapes and that their end portions fit into each other when carrying out the forming operation.

An element 140 in the form of a bell is also integral with the movable plate of the press. This element has a centre recess 141 through which the punch extends and it defines in its lower part a ramp 142 of concave shape which is frustoconical or curved cross-sectional shape, this shape being chosen in such manner as to obtain the desired displacement of the branches 112 of the mandrel when carrying out the forming operation.

The method for producing a stop ring according to the invention will now be described with reference to FIGS. 4 to 7. When there is placed in position F a blank constituted by a simple flat ring or washer obtained by means of a very simple and strong blanking tool of revolution, the various elements of the tool occupy the position shown in FIG. 5, in dot-dash line as concerns the sleeve 120 and the moving part formed by the punch 130 and the bell-shaped element 140. The branches of the punch are in an urged-together position whereas the branches of the mandrel are spread apart. The blank S is placed on the support surface 127 of the sleeve 120 (in its upper position) and is maintained laterally by the adjacent surface 118 of the mandrel 110.

The jack actuating the movable plate 102 is then supplied with fluid so as to lower the movable assembly comprising the punch 130 and bell 140. The punch engages the expansion rod 106 and its branches separate and bear by their ends against this upper face of the blank, thereby blocking it against the sleeve 120. Under the effect of this thrust, the sleeve moves away downwardly and compresses the springs 122 until it abuts against the surface 123 (position shown in FIG. 4).

Figure 6:
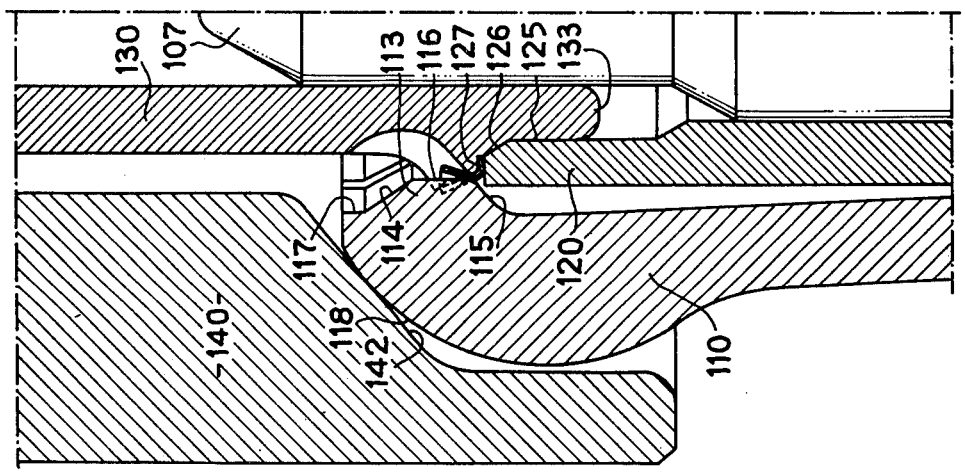
Figure 7:
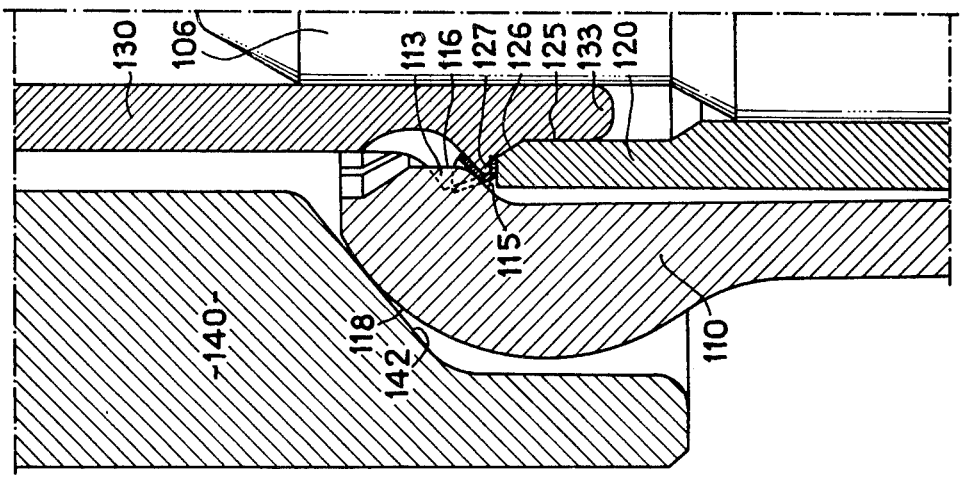

The forming operation proper is achieved by the relative axial displacement of the bell member 104 and mandrel 110 which radially displaces the branches of this sleeve. This operation is illustrated in FIGS. 5 to 7. The blank first comes in contact with the front face 114 of the sleeve and this results in a folding of the free part of the blank (FIG. 5). Then the blank passes beyond the flat or rounded surface 116 and the branches of the sleeve are displaced toward the axis Y—Y under the action of the ramp 142 continuing in this way the folding of the blank between the surface 115 of the sleeve and the surface 137 of the punch. The region of the blank in contact with the surfaces 138 of the punch already have their final position (FIG. 6). At the end of the forming operation, the various elements of the tool occupy the position shown in FIG. 7 and the stop ring is terminated.

The upper plate is displaced upwardly and drives along therewith the punch 130 and the bell member 140. The branches of the mandrel separate and the branches of the punch 130 move toward each other and the sleeve 120 is returned to the upper position by the spring 122 and ejects the finished ring.

It is important to note that this forming operation is limited to a folding. This eliminates the drawbacks inherent in for example a stamping operation.

In the course of this folding, the metal of the ring is not made to extend since this operation returns the periphery of the initial ring to a smaller diameter, the excess length resulting therefrom facilitating the desired formation of the corrugations. The distribution and the evenness of the shape of these corrugations is ensured by the tool itself.

The forming tool is consequently but very slightly stressed as concerns fatigue and wear and this also reduces production costs.

Thus it can be seen that the objects of the invention have been attained and that, owing to the particular shape of the stop ring and the original tool designed to produce the ring, the stresses undergone by the metal in the course of forming do not adversely affect its subsequent characteristics. Moreover, the ring may be mass-produced by reliable means whose working life may be considerable.

Having now described my invention what I claim as new and desire to secure by Letters Patent is:

1. A stop member, in particular for axially retaining at least one element located at the periphery of a central element, said member having a general shape of revolution and a substantially L-shaped cross section, a re-entrant angle defined by the two branches of the L facing the axis of the member, a skirt portion of said member which corresponds to a branch of the L which is substantially parallel to said axis having corrugations, and a flange of said member which is substantially perpendicular to the axis of said member corresponding to the other branch of the L.

2. A stop member as claimed in claim 1, wherein the corrugations have inner crests which define an opening whose diameter is less than the diameter of an opening defined by the flange of the member.

3. A stop member as claimed in claim 1, wherein the skirt portion has corrugations which are outwardly inclined in some zones.

4. An axial stop device for acting as a stop for at least one element on a central element, comprising a retaining groove in the central element and a stop member elastically engaged in the groove, the stop member having a general shape of revolution and a substantially L-shaped cross section, a re-entrant angle defined by the two branches of the L facing the axis of the member, a skirt portion of said member which corresponds to a branch of the L which is substantially parallel to said axis having corrugations, and a flange of said member which is substantially perpendicular to the axis of said member corresponding to the other branch of the L, the diameter of the opening defined by the flange of said member being slightly greater than the diameter of the central element and the minimum diameter of the opening defined by the skirt portion being less than the diameter of the central element.

5. A device as claimed in claim 4, comprising an apertured element to be retained, the maximum diameter of said member in the region of the skirt portion being slightly greater than the inside diameter of the aperture of the element to be retained.

* * * * *